(12) United States Patent
Ko et al.

(10) Patent No.: US 10,340,489 B2
(45) Date of Patent: Jul. 2, 2019

(54) SECONDARY BATTERY

(71) Applicant: SAMSUNG SDI CO., LTD., Yongin-si, Gyeonggi-do (KR)

(72) Inventors: Sunggwi Ko, Yongin-si (KR); Geunho Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 137 days.

(21) Appl. No.: 15/456,187

(22) Filed: Mar. 10, 2017

(65) Prior Publication Data
US 2017/0309879 A1    Oct. 26, 2017

(30) Foreign Application Priority Data

Apr. 22, 2016    (KR) .................. 10-2016-0049617

(51) Int. Cl.
| | |
|---|---|
| *H01M 2/12* | (2006.01) |
| *B32B 3/30* | (2006.01) |
| *B29C 65/00* | (2006.01) |
| *B32B 15/085* | (2006.01) |
| *H01M 2/04* | (2006.01) |
| *B32B 15/08* | (2006.01) |
| *B29C 65/16* | (2006.01) |
| *B29C 45/14* | (2006.01) |

(52) U.S. Cl.
CPC .......... *H01M 2/1235* (2013.01); *B29C 65/16* (2013.01); *B29C 66/30325* (2013.01); *B29C 2045/14319* (2013.01); *B32B 3/30* (2013.01); *B32B 15/08* (2013.01); *B32B 15/085* (2013.01); *H01M 2/0408* (2013.01); *H01M 2/1241* (2013.01); *H01M 2200/20* (2013.01)

(58) Field of Classification Search
CPC .......... H01M 2200/20; H01M 2/1235; H01M 2/1241; B32B 15/08; B32B 15/085; B32B 3/30; B29C 65/16; B29C 2045/14319; B29C 66/30325

See application file for complete search history.

(56) References Cited

U.S. PATENT DOCUMENTS

| | | | |
|---|---|---|---|
| 2007/0015046 A1 | 1/2007 | Kim et al. | |
| 2010/0310906 A1* | 12/2010 | Kim ................ | H01M 2/1241 429/82 |
| 2013/0192751 A1* | 8/2013 | Arai ................ | B29C 65/1635 156/272.6 |

FOREIGN PATENT DOCUMENTS

| | | |
|---|---|---|
| KR | 10-2007-0007537 | 1/2007 |
| KR | 10-2008-0036248 | 4/2008 |

OTHER PUBLICATIONS

Kikuchi et al., "Fabrication of Micropores and Grooves on Aluminum by Laser Irradiation and Electrochemical Technique," Oct. 12, 2001, Journal of the Electrochemical Society, 148, pp. C740-C745. (Year: 2001).*

* cited by examiner

*Primary Examiner* — Ula C Ruddock
*Assistant Examiner* — Matthew W Van Oudenaren
(74) *Attorney, Agent, or Firm* — Lewis Roca Rothgerber Christie LLP

(57) ABSTRACT

A secondary battery includes an electrode assembly, a case accommodating the electrode assembly, and a cap assembly coupled to a top portion of the case. The cap assembly includes a cap-up, a safety vent under the cap-up, a cap-down under the safety vent, an insulator between the safety vent and the cap-down, and a sub-plate on a bottom surface (Continued)

of the cap-down. Laser patterns formed by using a laser beam are on a bottom surface of the safety vent and a top surface of the cap-down.

9 Claims, 4 Drawing Sheets

SECONDARY BATTERY

CROSS-REFERENCE TO RELATED APPLICATION

This application claims priority to and the benefit of Korean Patent Application No. 10-2016-0049617, filed on Apr. 22, 2016 in the Korean Intellectual Property Office, the content of which is incorporated by reference herein in its entirety.

BACKGROUND

1. Field

Embodiments of the present invention relate to a secondary battery.

2. Description of the Related Art

Lithium ion secondary batteries are being widely used in portable electronic devices and as power sources of hybrid automobiles and electric vehicles because of various characteristics, including a relatively high operation voltage, relatively high energy density per unit weight, and so forth. The lithium ion secondary battery can be generally classified as a cylinder-type secondary battery, a prismatic-type secondary battery, or a pouch-type secondary battery. The cylindrical lithium ion secondary battery generally includes a cylindrical electrode assembly, a cylindrical can coupled to the electrode assembly, an electrolyte injected into the can to allow movement of lithium ions, and a cap assembly coupled to one side of the can to prevent leakage of the electrolyte and separation of the electrode assembly.

In addition, the cap assembly generally includes a cap-up, a safety vent installed under the cap-up, a cap-down installed under the safety vent, an insulator interposed between the safety vent and the cap-down, and a sub-plate positioned on a bottom surface of the cap-down. However, the electrolyte may leak between the safety vent and the insulator and between the insulator and the cap-down such that the safety of the secondary battery may be reduced.

SUMMARY

Embodiments of the present invention provide a secondary battery having improved coupling forces between a safety vent and an insulator and between the insulator and a cap-down by having laser patterns on the safety vent and the cap-down.

The above and other aspects of the present invention will be described in or will be apparent from the following description of exemplary embodiments thereof.

According to an embodiment of the present invention, a secondary battery includes an electrode assembly, a case accommodating the electrode assembly, and a cap assembly coupled to a top portion of the case. The cap assembly includes a cap-up, a safety vent under the cap-up, a cap-down under the safety vent, an insulator between the safety vent and the cap-down, and a sub-plate on a bottom surface of the cap-down. Laser patterns formed by using a laser beam are on a bottom surface of the safety vent and a top surface of the cap-down.

The laser patterns may each include a groove having a wedge shape.

An angle of the groove may be about 60 degrees, and a depth of the groove may be about 0.05 mm.

The insulator may be fused to the safety vent and the cap-down by thermal fusion, and protrusions may be on a surface of the insulator corresponding to the grooves of the laser patterns.

The laser patterns on the safety vent may have a ring shape extending along an outer peripheral edge of the safety vent, and the laser patterns may include a first laser pattern and a second laser pattern. The second laser pattern may be spaced from the first laser pattern and may be at an exterior side of the first laser pattern.

A width of each of the first laser pattern and the second laser pattern may be about 0.18 mm.

A distance between the first laser pattern and the second laser pattern may be about 0.8 mm.

The laser patterns of the safety vent and the cap down may be at corresponding positions on the safety vent and on the cap-down.

The safety vent and the cap-down may each include oxide coatings, and the oxide coatings may not be present at portions of the safety vent and the cap-down at where the laser patterns are located.

The insulator may be thermally fused to the laser patterns at where the oxide coatings are not present.

As described above, a secondary battery according to embodiments of the present invention has improved coupling forces between a safety vent and an insulator and between the insulator and a cap-down by having laser patterns formed on the safety vent and the cap-down. Accordingly, the secondary battery according to embodiments of the present invention may provide improved safety by preventing or reducing chances of an electrolyte penetrating into regions between the safety vent and the insulator and between the insulator and the cap-down.

BRIEF DESCRIPTION OF THE DRAWINGS

The above and other aspects of the present invention will become more apparent by describing, in detail, exemplary embodiments thereof with reference to the attached drawings in which.

DETAILED DESCRIPTION

Figure 1:
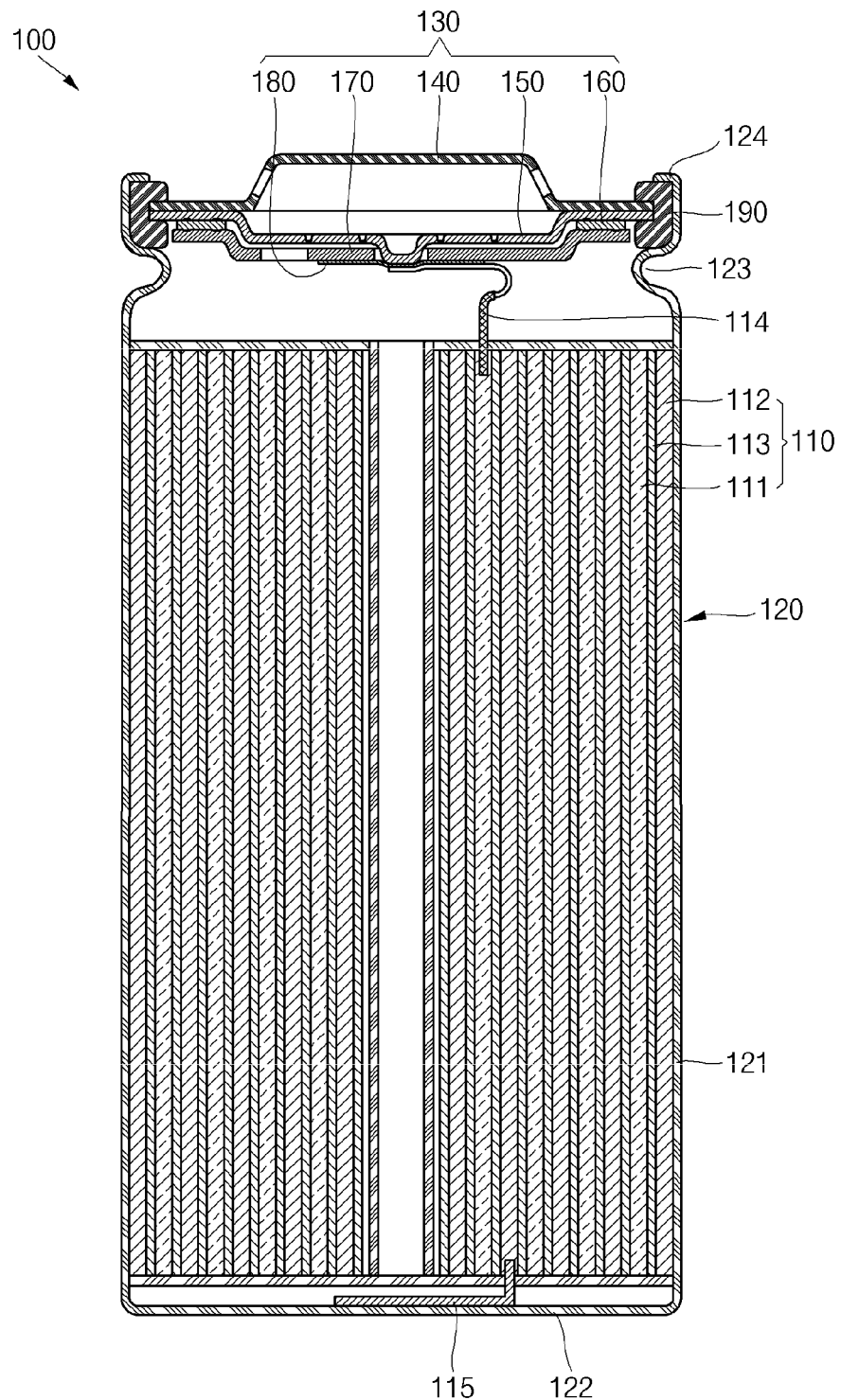
FIG. 1 is a cross-sectional view of a secondary battery according to an embodiment of the present invention.

Hereinafter, exemplary embodiments of the present invention will be described, in detail, with reference to the accompanying drawings such that they can easily be made and used by those skilled in the art. The present invention may, however, be embodied in many different forms and should not be construed as being limited to the embodiments set forth herein. Rather, these embodiments are provided so that this disclosure will be thorough and complete and will fully convey the concept of the present invention to those skilled in the art. The present invention will be defined by the appended claims and their equivalents.

In the drawings, thicknesses of layers and regions may be exaggerated for clarity. Like numbers refer to like elements throughout. As used herein, the term "and/or" includes any and all combinations of one or more of the associated listed items. In addition, it will be understood that when an element A is referred to as being "coupled to" or "connected to" an element B, the element A can be directly coupled or connected to the element B or an intervening element C may be present between the elements A and B so that the element A can be indirectly coupled or connected to the element B.

In addition, the terminology used herein is for the purpose of describing particular embodiments only and is not intended to be limiting thereof. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Figure 2:
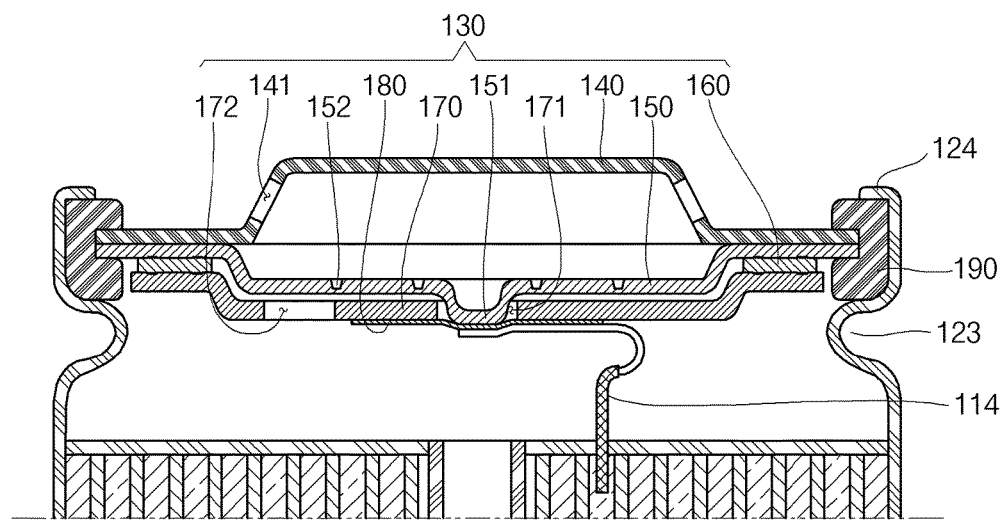
FIG. 2 is an enlarged cross-sectional view of a cap assembly shown in FIG. 1.

FIG. 1 is a cross-sectional view of a secondary battery according to an embodiment of the present invention, and FIG. 2 is an enlarged cross-sectional view of a cap assembly shown in FIG. 1.

Referring to FIGS. 1 and 2, the secondary battery 100 according to an embodiment of the present invention includes an electrode assembly 110, a case 120 accommodating the electrode assembly 110, a cap assembly 130 coupled to a top opening of the case 120, and a gasket 190 tightly sealing the case 120 and the cap assembly 130 (e.g., sealing between the case 120 and the cap assembly 130).

The electrode assembly 110 includes a first electrode 111, a second electrode 112, and a separator 113 interposed between the first electrode 111 and the second electrode 112. The electrode assembly 110 may be formed by winding a stacked structure including the first electrode 111, the separator 113, and the second electrode 112 in a jelly-roll configuration. In some embodiments, the first electrode 111 may function as a positive electrode and the second electrode 112 may function as a negative electrode. However, the present invention is not limited thereto, and in other embodiments, the first electrode 111 may function as the negative electrode and the second electrode 112 may function as the positive electrode. A first electrode tab 114 on the electrode assembly 110 (e.g., connected to or extending from a top of the electrode assembly 110) is connected to the cap assembly 130, and a second electrode tab 115 under the electrode assembly 110 (e.g., connected to or extending from a bottom of the electrode assembly 110) is connected to the case 120.

The first electrode 111 is formed by coating a first electrode active material, such as a transition metal oxide, on a first electrode current collector formed of a metal foil, such as an aluminum foil. A first electrode uncoated portion, without the first electrode active material coated thereon, is formed on the first electrode 111, and the first electrode tab 114 is attached to the first electrode uncoated portion. One end of the first electrode tab 114 is electrically connected to the first electrode 111, and the other end of the first electrode tab 114 upwardly protrudes from the electrode assembly 110 and is electrically connected to the cap assembly 130.

The second electrode 112 is formed by coating a second electrode active material, such as graphite or carbon, on a second electrode current collector formed of a metal foil, such as a copper or nickel foil. A second electrode uncoated portion, without the second electrode active material coated thereon, is formed on the second electrode 112, and the second electrode tab 115 is attached to the second electrode uncoated portion. One end of the second electrode tab 115 is electrically connected to the second electrode 112, and the other end of the second electrode tab 115 downwardly protrudes from the electrode assembly 110 and is electrically connected to a bottom surface of the case 120.

The separator 113 is positioned between the first electrode 111 and the second electrode 112 to prevent an electric short therebetween while allowing movement of lithium ions. The separator 113 may be made of polyethylene (PE), polypropylene (PP), or a composite film of PE and PP.

The case 120 includes a side surface plate 121 that is a cylindrical body having a certain diameter (e.g., a predetermined diameter) to form a space in which the electrode assembly 110 is accommodated and a bottom surface plate 122 sealing a bottom portion or bottom end of the side surface plate 121. The top opening of the case 120 is configured to be closed after the electrode assembly 110 is inserted into the case 120. In addition, a beading part 123 to reduce or prevent movement of the electrode assembly 110 is formed at a top portion of the case 120. In addition, a crimping part 124 for fixing the cap assembly 130 and the gasket 190 is formed at a topmost portion of the case 120.

The cap assembly 130 includes a cap-up 140, a safety vent 150 installed under the cap-up 140, a cap-down 170 installed under the safety vent 150, an insulator 160 interposed between the safety vent 150 and the cap-down 170, and a sub-plate 180 fixed to a bottom surface of the cap-down 170 and electrically connected to the first electrode tab 114. In the cap assembly 130, a current interruption device (CID) includes (e.g., is constituted by) the safety vent 150, the sub-plate 180, and a connecting portion partially connecting the safety vent 150 and the sub-plate 180 to each other. The safety vent 150 is electrically insulated from the sub-plate 180 by the insulator 160. The connecting portion may be formed by welding the safety vent 150 and the sub-plate 180 to each other.

The cap-up 140 has a top portion that is convexly formed and configured to be electrically connected to an external circuit. The cap-up 140 has a gas discharge opening 141 (e.g., a gas discharge hole) formed to provide a path through which internal gas generated in the case 120 may be discharged. The cap-up 140 is electrically connected to the electrode assembly 110 and transmits current generated by the electrode assembly 110 to an external circuit.

The safety vent 150 has a circular shape (e.g., the safety vent 150 is a circular panel body) corresponding to the cap-up 140. A downwardly protruding protrusion 151 is formed in the center (e.g., at approximately the center) of the safety vent 150. The safety vent 150 is electrically connected to the sub-plate 180, which is fixed to the bottom surface of the cap-down 170, by the protrusion 151, which passes through an opening 171 (e.g., a through-hole) in the cap-down 170. In some embodiments, the protrusion 151 of the safety vent 150 and the sub-plate 180 may be welded to each other by laser welding, ultrasonic welding, resistance welding, or an equivalent thereof. In addition, a notch 152 for guiding (e.g., for initiating) a rupture of the safety vent 150 is formed on or along the outer peripheral edge of the protrusion 151.

An outer peripheral edge of the safety vent 150 is installed to tightly contact portions of the cap-up 140 other than the upwardly protruding portion of the cap-up 140. For example, the outer peripheral edge of the safety vent 150 and an outer peripheral edge of the cap-up 140 contact each other. The safety vent 150 is configured to discharge the internal gas from the case 120 while interrupting the flow of current when an abnormal pressure is generated in the case 120. When an internal pressure of the case 120 exceeds an operating pressure (e.g., a rupture pressure) of the safety vent 150, the protrusion 151 upwardly rises due to the gas discharged through a gas discharge opening 172 (e.g., a gas discharge hole) in the cap-down 170 and is electrically disconnected from the sub-plate 180. In some embodiments, the welded portion of the protrusion 151 is broken and the safety vent 150 and the sub-plate 180 are electrically disconnected from each other. If the internal pressure of the case 120 exceeds a rupture pressure that is higher than the operating pressure of the safety vent 150, the notch 152 of the safety vent 150 ruptures, thereby preventing the secondary battery 100 from exploding or reducing chances that the secondary battery 100 may explode.

The insulator 160, which is interposed between the safety vent 150 and the cap-down 170, insulates the safety vent 150 and the cap-down 170 from each other. For example, the insulator 160 is interposed between the outer peripheral edge of the safety vent 150 and the outer peripheral edge of the cap-down 170. The insulator 160 may be made of a resin material, such as polyethylene (PE), polypropylene (PP), or polyethylene terephthalate (PET).

The cap-down 170 has a circular shape (e.g., the cap-down 170 is a circular panel body). The opening 171 is formed at the center (e.g., at approximately the center) of the cap-down 170, and the protrusion 151 of the safety vent 150 passes through the opening 171. In addition, the gas discharge opening 172 is formed at one portion of the cap-down 170, and the internal gas is discharged through the gas discharge opening 172 when an excessive internal pressure is generated in the case 120. In some embodiments, the protrusion 151 of the safety vent 150 rises due to the gas that is discharged through the gas discharge opening 172 such that the protrusion 151 may be separated from the sub-plate 180.

The sub-plate 180 is positioned under the cap-down 170. The sub-plate 180 is welded between the first electrode tab 114 and the protrusion 151 of the safety vent 150, which passes through the opening 171 in the cap-down 170. Accordingly, the sub-plate 180 electrically connects the first electrode tab 114 and the safety vent 150 to each other. If the internal pressure of the case 120 increases, the protrusion 151 of the safety vent 150 may rise such that the sub-plate 180 may be electrically disconnected from the safety vent 150.

The gasket 190 is installed in the top opening of the case 120. For example, the gasket 190 is tightly adhered to regions between the outer peripheral edges of the cap-up 140 and the safety vent 150 and the top opening of the case 120. The gasket 190 may prevent the cap assembly 130 from being separated from the case 120 or may reduce chances that the cap assembly 130 is separated from the case 120.

Figure 3:
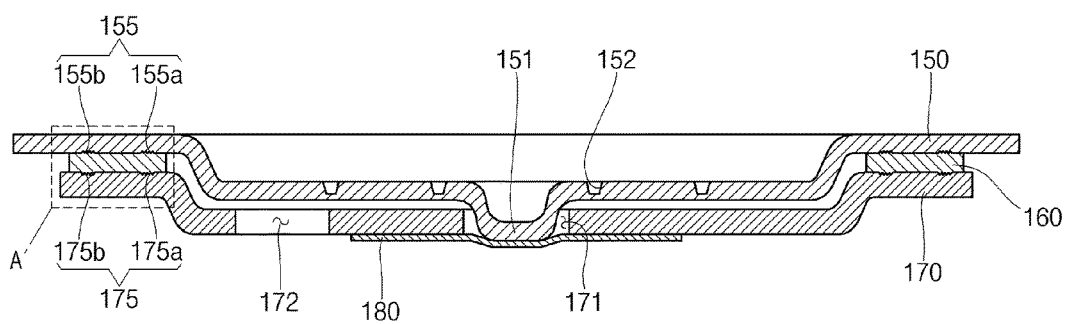
FIG. 3 is a cross-sectional view of an insulator interposed between a safety vent and a cap-down of the cap assembly shown in FIG. 2.
Figure 4:
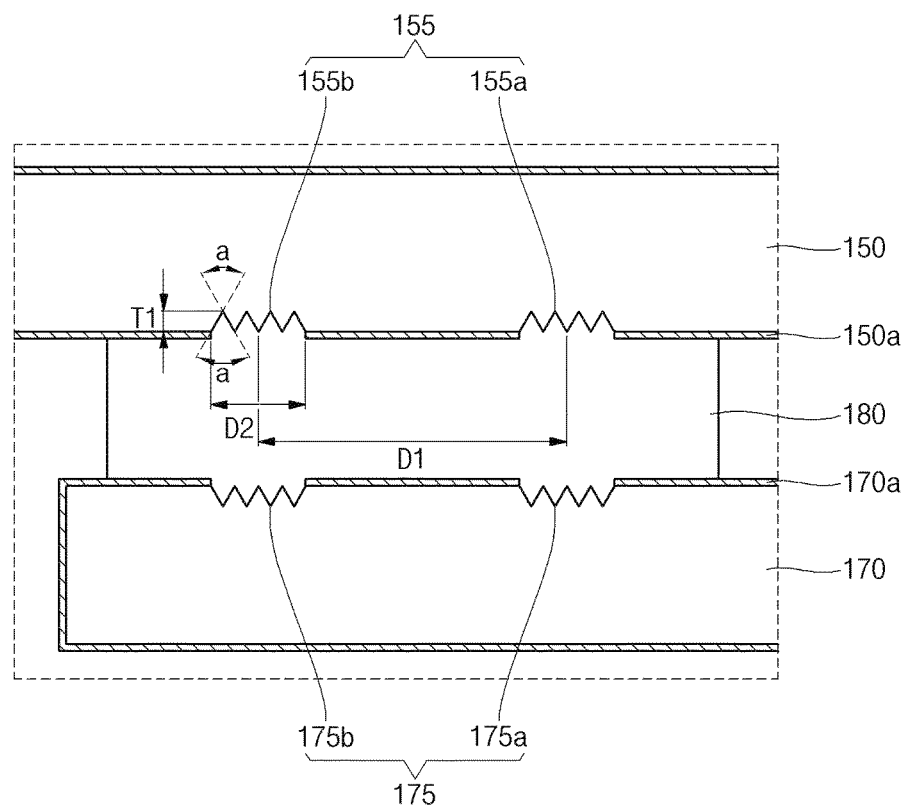
FIG. 4 is an enlarged cross-sectional view of the portion 'A' of FIG. 3.
Figure 5:
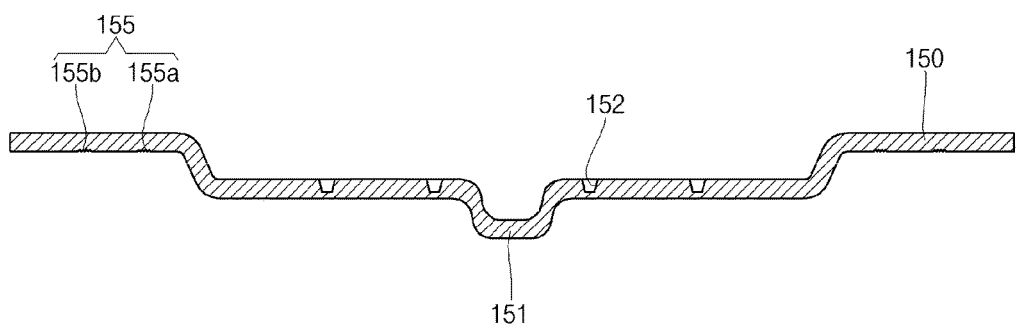
FIG. 5 is a cross-sectional view of the safety vent shown in FIGS. 1-4.

FIG. 3 is a cross-sectional view of an insulator interposed between a safety vent and a cap-down, FIG. 4 is an enlarged cross-sectional view of the portion 'A' of FIG. 3, and FIG. 5 is a cross-sectional view of the safety vent.

Referring to FIGS. 3-5, laser patterns 155 and 175 are formed on a bottom surface of the safety vent 150 and a top surface of the cap-down 170, respectively, and the insulator 160 is interposed between the safety vent 150 and the cap-down 170. For example, the insulator 160 is interposed between the laser pattern 155 of the safety vent 150 and the laser pattern 175 of the cap-down 170 and is fused into the laser patterns 155 and 175 by thermal fusion, thereby improving a coupling force between the safety vent 150 and the cap-down 170. In some embodiments, the insulator 160 has a ring shape (e.g., has approximately a ring shape) having planar top and bottom surfaces to be interposed between the safety vent 150 and the cap-down 170. Thereafter, when heat is applied to the outer peripheral edges of the safety vent 150 and the cap-down 170 for the purpose of coupling the safety vent 150 and the cap-down 170 to each other, the insulator 160 is fused (e.g., melted) and penetrates into the laser patterns 155 and 175 to be welded to the safety vent 150 and the cap-down 170. Therefore, the top and bottom surfaces of the insulator 160 are transformed so as to conform to the laser patterns 155 and 175. For example, protrusions corresponding to the laser patterns 155 and 175 are formed on the top and bottom surfaces of the insulator 160.

A first laser pattern 155a and a second laser pattern 155b are formed on the bottom surface of the safety vent 150. In addition, a first laser pattern 175a and a second laser pattern 175b are formed on the top surface of the cap-down 170. In some embodiments, the first and second laser patterns 155a and 155b and the first and second laser patterns 175a and 175b are formed at corresponding positions of the safety vent 150 and the cap-down 170, respectively, in the same or substantially the same manner. Therefore, the following description will primarily focus on the first and second laser patterns 155a and 155b formed on the safety vent 150.

Figure 6:
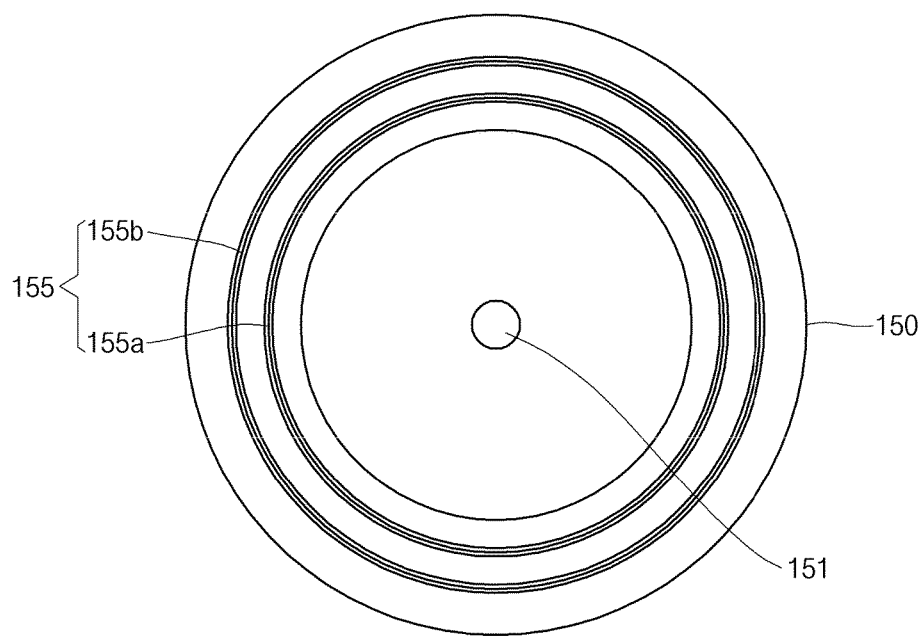
FIG. 6 is a bottom view of the safety vent shown in FIG. 5.

The laser pattern 155 is formed on the bottom surface of the safety vent 150. For example, the laser pattern 155 is formed on a bottom surface of the outer peripheral edge of the safety vent 150, for example, on a portion of the safety vent 150 that contacts the cap-up 140. The laser pattern 155 is formed by irradiating a laser beam onto the bottom surface of the safety vent 150. The laser pattern 155 includes a first laser pattern 155a formed to be close to the center of the safety vent 150 and a second laser pattern 155b spaced from (e.g., spaced apart from) the first laser pattern 155a and positioned at an exterior side of (e.g., outside of) the first laser pattern 155a. As shown in FIG. 6, the first laser pattern 155a and the second laser pattern 155b are ring shaped (e.g., are approximately ring shaped) and are concentrically formed. For example, the first laser pattern 155a is formed at an interior portion of the outer peripheral edge of the safety vent 150, and the second laser pattern 155b is formed at an exterior portion of the outer peripheral edge of the safety vent 150. For example, the first laser pattern 155a may have a diameter in a range of about 10.7 mm to about 11.3 mm, and the second laser pattern 155b may have a diameter in a range of about 12.3 mm to about 12.9 mm.

In addition, as shown in FIG. 4, the first and second laser patterns 155a and 155b are grooves that are inwardly recessed from a surface of the safety vent 150. In addition, each of the first and second laser patterns 155a and 155b includes one or more grooves that have a wedge shape (e.g., a 'v' shape). While the embodiment illustrated in FIG. 4 includes four grooves formed in each of the laser patterns, more than or fewer than four grooves may be formed in each of the laser patterns. In addition, an angle (a) formed by the grooves may be about 60 degrees (e.g., bottoms of the grooves may form about 60 degree angles).

A distance D1 between the first laser pattern 155a and the second laser pattern 155b is about 0.8 mm. In addition, a width D2 of each of the first laser pattern 155a and the second laser pattern 155b is about 0.18 mm. If the width D2 is less than about 0.18 mm, the insulator 160 may not be large enough to provide increased coupling force (or may provide a reduced coupling force) between the safety vent 150 and the cap-down 170.

Further, the laser pattern 155 has a depth T1 of about 0.05 mm. If the depth T1 of the laser pattern 155 is less than about 0.05 mm, a relatively small amount of the insulator 160 may be fused into the laser pattern 155, thereby reducing the coupling force between the safety vent 150 and the cap-down 170. In addition, if the depth T1 of the laser pattern 155 is greater than about 0.05 mm, the insulator 160 may not be sufficiently fused into the laser pattern 155, thereby creating an empty space between the safety vent 150 and the insulator 160. In such cases, an electrolyte may penetrate into the empty space, thereby reducing the coupling force between the safety vent 150 and the cap-down 170.

Because the laser pattern 175 formed in the cap-down 170 has the same or substantially the shape as that of the laser pattern 155 formed in the safety vent 150, a detailed description thereof may not be given.

The laser patterns 155 and 175 are formed using a laser beam to have very finely formed patterns. As described above, each of the laser patterns 155 and 175 has a relatively small width (e.g., about 0.18 mm) and, in some embodiments, includes a plurality of grooves. Therefore, electrolyte penetration paths between the safety vent 150 and the insulator 160 and between the insulator 160 and the cap-down 170 are relatively long, thereby reducing electrolyte penetration into regions between the safety vent 150 and the insulator 160 and between the insulator 160 and the cap-down 170. Generally, if mold patterns are formed on a safety vent and/or a cap-down by using molds, each of the mold patterns will have a greater width than each of the laser patterns 155 and 175, thereby allowing the electrolyte to easily penetrate into the regions between the safety vent and/or the cap-down and the insulator. According to embodiments of the present invention, however, the coupling forces between the safety vent 150 and the insulator 160 and between the insulator 160 and the cap-down 170 are increased by forming the finely formed laser patterns 155 and 175 in the safety vent 150 and the cap-down 170 by using a laser beam, thereby preventing the electrolyte from penetrating into the regions between the safety vent 150 and the insulator 160 and between the insulator 160 and the cap-down 170. Therefore, the safety of the secondary battery 100 according to embodiments of the present invention is improved.

In some embodiments, the safety vent 150 is made of a metal, for example, aluminum. When the safety vent 150 made of aluminum is exposed to air it oxidizes to form a thin oxide coating 150a on a surface thereof. When the laser pattern 155 is formed by irradiating a laser beam onto the safety vent 150, the oxide coating 150a is removed by the irradiated laser beam. For example, the oxide coating 150a does not exist in a region of the safety vent 150 where the laser pattern 155 is formed. Likewise, in some embodiments, the cap-down 170 may be also made of aluminum. Therefore, a thin oxide coating 170a is formed on a surface of the cap-down 170, and the oxide coating 170a is removed when the laser pattern 175 is formed by irradiating a laser beam onto the cap-down 170. For example, the oxide coating 170a does not exist in a region of the cap-down 170 where the laser pattern 175 is formed. Accordingly, the insulator 160 is thermally fused into the laser patterns 155 and 175 from which the oxide coatings 150a and 170a are removed, thereby further improving the coupling force between the safety vent 150 and the cap-down 170.

Figure 7:
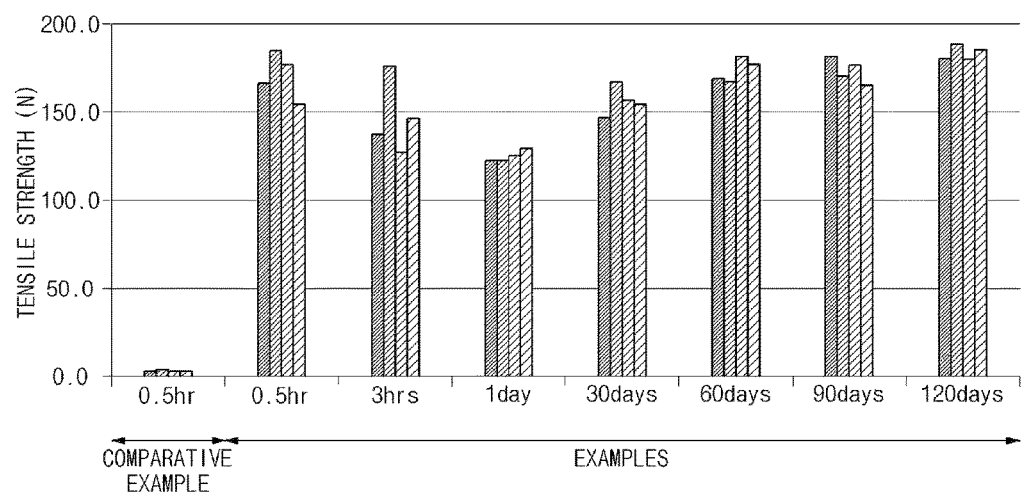
FIG. 7 is a graph illustrating tensile strengths of current interruption devices (CIDs) in electrolyte immersion tests as measured over time.

FIG. 7 is a graph illustrating tensile strengths of current interruption devices (CIDs) in electrolyte immersion tests as measured over time.

In the Comparative Example, a secondary battery includes patterns formed in a safety vent and/or a cap-down by using molds. In the Examples, secondary batteries include laser patterns formed in a safety vent and a cap-down by using a laser beam. Tests were carried out on arbitrary secondary batteries to measure their tensile strengths over time.

As shown in FIG. 7, the tensile strength of the current interruption device (CID) in the Comparative Example is reduced to less than 3 N after being immersed in an electrolyte for about 30 minutes (0.5 hr.). In contrast, the tensile strength of the current interruption devices (CIDs) according to embodiments of the present invention is maintained at about 100 N or greater even after being immersed in an electrolyte for about 120 days. For example, when the laser patterns 155 and 175 are formed in the safety vent 150 and the cap-down 170 by using a laser beam according to embodiments of the present invention, the electrolyte can be prevented from penetrating into (or a reduced amount of the electrolyte may penetrate into) regions between the safety vent 150 and the insulator 160 and between the insulator 160 and the cap-down 170, thereby improving the coupling forces between the safety vent 150 and the insulator 160 and between the insulator 160 and the cap-down 170.

While a secondary battery has been particularly shown and described according to exemplary embodiments of the present invention, it will be understood by those of ordinary skill in the art that various changes in form and details may be made therein without departing from the spirit and scope of the present invention as defined by the following claims and their equivalents.

What is claimed is:

1. A secondary battery comprising:
an electrode assembly;
a case accommodating the electrode assembly; and
a cap assembly coupled to a top portion of the case, the cap assembly comprising a cap-up, a safety vent under the cap-up, a cap-down under the safety vent, an insulator between the safety vent and the cap-down, and a sub-plate on a bottom surface of the cap-down, laser patterns formed by using a laser beam being on a bottom surface of the safety vent and a top surface of the cap-down,
wherein the laser patterns on the safety vent have a ring shape extending along an outer peripheral edge of the safety vent, and
wherein the laser patterns comprise a first laser pattern and a second laser pattern, the second laser pattern being spaced from the first laser pattern with a smooth portion of the safety vent therebetween, the second laser pattern being at an exterior side of the first laser pattern.

2. The secondary battery of claim 1, wherein the laser patterns each comprise a groove having a wedge shape.

3. The secondary battery of claim 2, wherein an angle of the groove is about 60 degrees, and a depth of the groove is about 0.05 mm.

4. The secondary battery of claim 2, wherein the insulator is fused to the safety vent and the cap-down by thermal fusion, and
wherein a protrusion is on a surface of the insulator corresponding to the grooves of the laser patterns.

5. The secondary battery of claim 1, wherein a width of each of the first laser pattern and the second laser pattern is about 0.18 mm.

6. The secondary battery of claim 1, wherein a distance between the first laser pattern and the second laser pattern is about 0.8 mm.

7. The secondary battery of claim 1, wherein the laser patterns of the safety vent and the cap-down are at corresponding positions on the safety vent and on the cap-down.

8. The secondary battery of claim 1, wherein the safety vent and the cap-down each comprise oxide coatings, and
wherein the oxide coatings are not present at portions of the safety vent and the cap-down at where the laser patterns are located.

9. The secondary battery of claim 8, wherein the insulator is thermally fused to the laser patterns at the portions where the oxide coatings are not present.

* * * * *